(12) United States Patent
Tanaka

(10) Patent No.: US 8,469,513 B2
(45) Date of Patent: Jun. 25, 2013

(54) RETINAL SCANNING DISPLAY

(75) Inventor: Mitsugi Tanaka, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 362 days.

(21) Appl. No.: 12/891,223

(22) Filed: Sep. 27, 2010

(65) Prior Publication Data
US 2011/0013246 A1   Jan. 20, 2011

Related U.S. Application Data

(63) Continuation-in-part of application No. PCT/JP2009/055084, filed on Mar. 16, 2009.

(30) Foreign Application Priority Data

Mar. 31, 2008 (JP) .................................. 2008-094163

(51) Int. Cl.
 *A61B 3/10* (2006.01)
(52) U.S. Cl.
 USPC ........................................................ 351/205
(58) Field of Classification Search
 USPC .................... 351/205, 246, 200, 221
 See application file for complete search history.

(56) References Cited

U.S. PATENT DOCUMENTS

| 5,701,132 | A | 12/1997 | Kollin et al. |
| 7,637,616 | B2 | 12/2009 | Watanabe |
| 2002/0014579 | A1* | 2/2002 | Dunfield ........................ 250/216 |
| 2002/0141023 | A1* | 10/2002 | Yamada et al. ................ 359/198 |
| 2009/0273822 | A1 | 11/2009 | Watanabe |

FOREIGN PATENT DOCUMENTS

| JP | A-2006-98570 | 4/2006 |
| JP | A-2007-264555 | 10/2007 |

OTHER PUBLICATIONS

International Search Report issued in International Application No. PCT/JP2009/055084 on Apr. 7, 2009 (with translation).

* cited by examiner

*Primary Examiner* — James Greece
(74) *Attorney, Agent, or Firm* — Oliff & Berridge, PLC

(57) ABSTRACT

In a retinal scanning display, a light source part generates light modulated in response to an image signal relating to an image, and an image is displayed by scanning the light radiated from the light source part. The retinal scanning display includes a diffraction element which is arranged on an optical path of the light radiated from the light source part and diffracts light in a predetermined diffraction direction. The diffraction element is arranged such that the diffraction element is arranged such that a projection of a diffraction direction on the diffraction element with respect to a scanning direction of the scanning part becomes approximately 45 degrees.

5 Claims, 8 Drawing Sheets

THIS EMBODIMENT

CONVENTIONAL EXAMPLE

THIS EMBODIMENT

CONVENTIONAL EXAMPLE

RETINAL SCANNING DISPLAY

CROSS-REFERENCE TO RELATED APPLICATIONS

The present application is a Continuation-in-Part of International Application PCT/JP2009/055084 filed on Mar. 16, 2009, which claims the benefits of Japanese Patent Application No. 2008-094163 filed Mar. 31, 2008.

BACKGROUND

1. Field

The present invention relates to a retinal scanning display, and more particularly to a retinal scanning display which displays an image by scanning light modulated in response to an image signal relating to the image in the predetermined scanning directions.

2. Description of the Related Art

Conventionally, there has been known a device which displays an image in a visually recognizable manner by radiating light from a light source part modulated in response to an image signal to the outside as a radiation light. Further, there has been also known a retinal scanning display in which the light which is radiated to the outside in this manner is scanned in the predetermined scanning direction and is incident on an eye of a user so that an image is projected on a retina of the eye.

In such a retinal scanning display, as disclosed in JP-A-2006-98570 (patent document 1), a diffraction grating which diffracts the light from the light source part in the predetermined diffraction direction is arranged on an optical path. Grooves are formed on such a diffraction grating along the diffraction direction. By arranging the diffraction grating on the optical path, the light is diffracted thus allowing the light to easily enter a pupil of the user.

SUMMARY

In the above-mentioned retinal scanning display, there has been a case where a line-shaped pattern (so-called "beat") periodically occurs. The beat occurs attributed to the relationship between a pitch of grooves formed on the diffraction grating and a pitch of the scanning lines and hence, it is necessary to design an image display device by taking such a phenomenon into consideration. However, the complete elimination of such a pattern is not easy.

It is an object of the present invention to provide a retinal scanning display which can prevent the periodic occurrence of a line-shaped pattern.

According to one aspect of the present invention, there is provided a retinal scanning display which includes: a light source part which is configured to radiate a light modulated in response to an image signal relating to an image; a scanning part which is configured to display the image by scanning the light radiated from the light source part in a predetermined direction; and a diffraction element which is arranged on an optical path of the light radiated from the light source part and is configured to diffract the light radiated from the light source part in a predetermined diffraction direction. The diffraction element is arranged such that a projection of a diffraction direction on the diffraction element with respect to a scanning direction of the scanning part becomes approximately 45 degrees.

DETAILED DESCRIPTION

Hereinafter, preferred embodiments of the present invention are explained hereinafter in conjunction with drawings.

[Electrical Constitution of Image Display Device]

Figure 1:
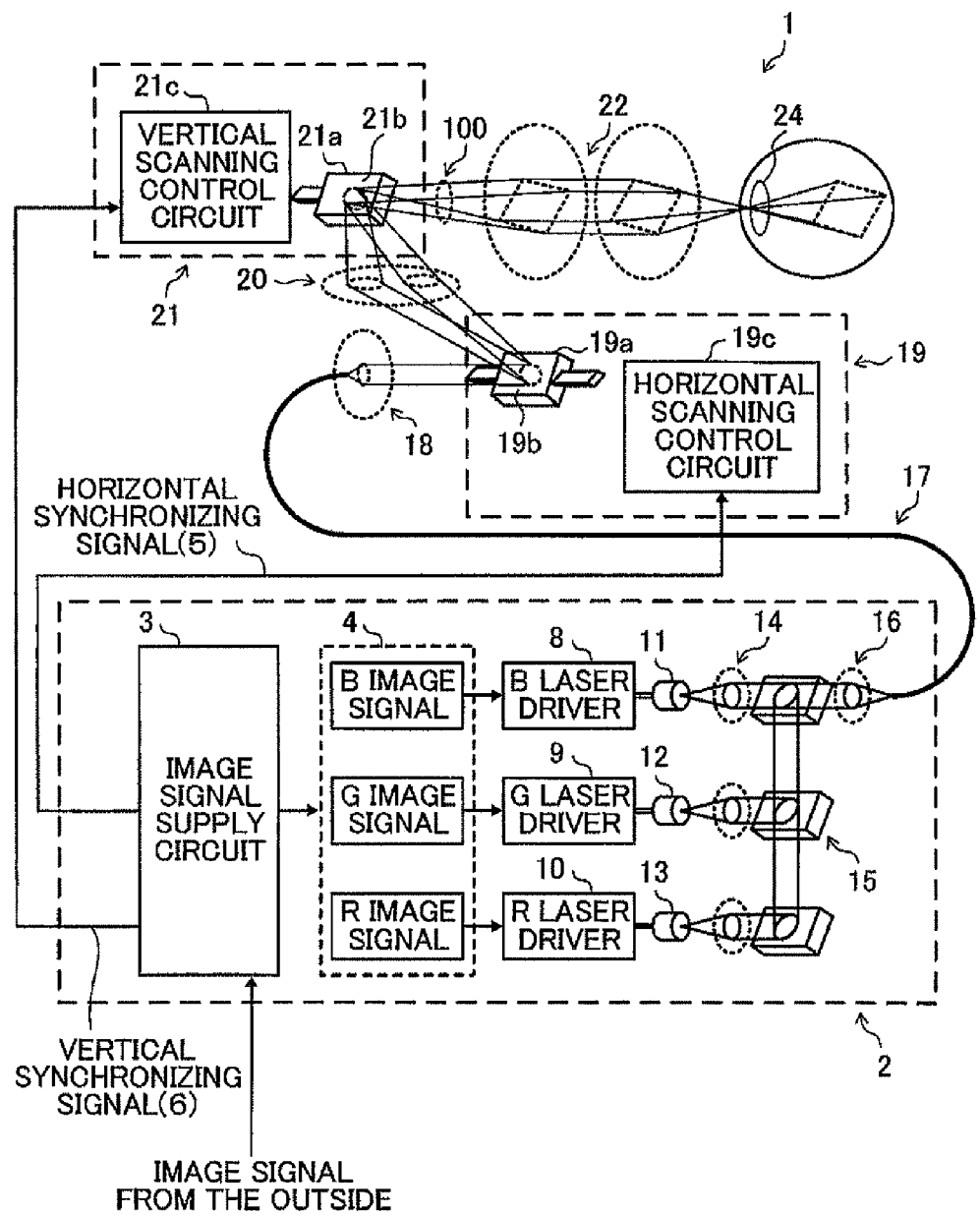
FIG. 1 is an explanatory view showing the electric constitution of a retinal scanning display according to an embodiment.

The electrical constitution of a retinal scanning display 1 of this embodiment or the like is explained in conjunction with FIG. 1.

As shown in FIG. 1, in the retinal scanning display 1, a light source unit part 2 is provided for processing image signals supplied from the outside. The light source unit part 2 includes an image signal supply circuit 3 to which the image signal is inputted from the outside. The image signal supply circuit 3 generates respective signals which become elements for synthesizing an image in response to the image signals. An image signal 4, a horizontal synchronizing signal 5 and a vertical synchronizing signal 6 are outputted from the image signal supply circuit 3. Further, the light source unit part 2 also includes an R laser driver 10, a G laser driver 9 and a B laser driver 8. These laser drivers 10, 9, 8 are provided for driving an R laser 13, a G laser 12 and a B laser 11 such that these lasers 13, 12, 11 radiate laser beams whose intensities are respectively modulated in response to the respective image signals of red (R), green (G) and blue (B) transmitted from the image signal supply circuit 3 as image signals 4. These R laser 13, G laser 12 and B laser 11 correspond to one example of a light source part which radiates light which is modulated in response to the image signal relating to an image. Further, the light source unit part 2 includes collimation optical systems 14 for collimating laser beams radiated from the respective lasers, dichroic mirrors 15 for synthesizing collimated laser beams and a coupling optical system 16 for guiding the synthesized laser beams to an optical fiber 17. The R laser 13, the G laser 12 and the B laser 11 may be formed of a semiconductor laser such as a laser diode or a solid laser. The light source unit part 2 of this embodiment, for example, includes at least one light source and a modulation part which modulates intensity of an optical flux (laser beam) radiated from the light source in response to the image signal.

Further, the retinal scanning display 1 also includes a collimation optical system 18 for guiding the laser beams transmitted from the light source unit part 2 to a horizontal scanning system 19, the horizontal scanning system 19 for scanning the collimated laser beams in the horizontal direction by making use of a Galvano mirror 19a, a first relay optical system 20 for guiding the laser beams scanned by the horizontal scanning system 19 to a vertical scanning system 21, the vertical scanning system 21 for scanning the laser beams which are scanned by the horizontal scanning system 19 and are incident thereon by way of the first relay optical system 20 in the vertical direction by making use of a Galvano mirror 21a, a diffraction grating 100 (corresponding to one example of diffraction element) which facilitates the incidence of the laser beams scanned by the vertical scanning system 21 on a pupil 24 of a user, and a second relay optical system 22 which allows the laser beams scanned by the vertical scanning system 21 to be incident on the pupil 24 of a user. Also in this embodiment, the diffraction grating 100 which is described in detail later has an optical dispersion function which disperses the laser beams. The optical dispersion function is a function of splitting or dispersing (scattering) one incident laser beam into a plurality of laser beams, and the optical dispersion function is decided based on a grating pitch or a periodic arrangement direction of the diffraction grating 100 in this embodiment.

As one specific example, the horizontal scanning system 19 is an optical system which performs horizontal scanning (one example of primary scanning) for scanning the laser beams in the horizontal direction for each scanning line of an image to be displayed. Further, the horizontal scanning system 19 includes the Galvano mirror 19a for scanning the laser beams in the horizontal direction and a horizontal scanning control circuit 19c which performs a driving control of the Galvano mirror 19a.

On the other hand, the vertical scanning system 21 is an optical system which performs a vertical scanning (one example of secondary scanning) for scanning the laser beams in the vertical direction from a first scanning line toward a last scanning line for every frame of the image to be displayed. Further, the vertical scanning system 21 includes the Galvano mirror 21a which performs the vertical scanning and a vertical scanning control circuit 21c which performs a driving control of the Galvano mirror 21a.

The horizontal scanning system 19 is configured to scan the laser beams at a higher speed, that is, at a higher frequency than the vertical scanning system 21. Further, as shown in FIG. 1, the horizontal scanning system 19 and the vertical scanning system 21 are connected to the image signal supply circuit 3 respectively and are configured to scan the laser beams in synchronism with a horizontal synchronizing signal 5 and a vertical synchronizing signal 6 outputted from the image signal supply circuit 3.

Here, the horizontal scanning system 19, the vertical scanning system 21 and the like according to this embodiment are exemplified as one example of the optical scanning device which forms a frame by scanning the incident optical flux in the first scanning direction as well as in the second scanning direction approximately orthogonal to the first scanning direction. Further, the horizontal scanning system 19 according to this embodiment corresponds to one example of a first scanning part for scanning the incident optical flux in the horizontal direction (first scanning direction), while the vertical scanning system 21 according to this embodiment corresponds to one example of a second scanning part for scanning the optical flux scanned in the horizontal direction in the vertical direction which is orthogonal to the horizontal direction (second scanning direction). Further, the horizontal scanning system 19 and the vertical scanning system 21 according to this embodiment correspond to one example of a scanning part which includes the first scanning part and the second scanning part and scans light radiated from the light source in the predetermined scanning directions.

Next, operational steps ranging from a step in which the retinal scanning display 1 of one embodiment according to the present invention receives an image signal from the outside to a step in which an image is projected on the retina of the user are explained in conjunction with FIG. 1.

As shown in FIG. 1, in the retinal scanning display 1 of this embodiment, when the image signal supply circuit 3 formed in the light source unit part 2 receives the image signal from the outside, the image signal supply circuit 3 outputs the image signal 4 constituted of an R image signal, a G image signal and a B image signal for outputting laser beams of respective colors of red, green, blue, the horizontal synchronizing signal 5 and the vertical synchronizing signal 6. In response to the respective inputted R image signal, G image signal and B image signal, the R laser driver 10, the G laser driver 9 and the B laser driver 8 output respective driving signals to the R laser 13, the G laser 12 and the B laser 11. In response to these driving signals, the R laser 13, the G laser 12 and the B laser 11 respectively generate the laser beams whose intensities are modulated and output the respective laser beams to the collimation optical system 14. Further, the image signal supply circuit 3 generates the laser beams in response to a BD signal (not shown in the drawing) indicative of a driving state of the Galvano mirror 19a described later and controls timing for outputting the respective laser beams to the collimation optical system 14. That is, in such a retinal scanning display 1, the image signal supply circuit 3 controls timing at which the laser beams are radiated to the Galvano mirror 19a or the like. The laser beams generated from spot light sources are respectively collimated by the collimation optical systems 14. Further, the laser beams are incident on the dichroic mirror 15 to be synthesized into one laser beam and, thereafter, the laser beam is guided to be incident on the optical fiber 17 by the coupling optical system 16.

The laser beams transmitted through the optical fiber 17 are collimated by the collimation optical system 18 and the collimated laser beams are radiated to the horizontal scanning system 19. The radiated laser beams are incident on a deflection plane 19b of the Galvano mirror 19a in the horizontal scanning system 19. The laser beams which are incident on the deflection plane 19b of the Galvano mirror 19a are scanned in the horizontal direction in synchronism with a horizontal synchronizing signal and, via the first relay optical system 20, are incident on the deflection plane 21b of the Galvano mirror 21a in the vertical scanning system 21. The Galvano mirror 21a is reciprocally oscillated in synchronism with the vertical synchronizing signal 6 in the same manner as the synchronization of the Galvano mirror 19a with the horizontal synchronizing signal such that the deflection plane 21b of the Galvano mirror 21a reflects the incident light in the vertical direction whereby the laser beams are scanned in the vertical direction using the Galvano mirror 21a. The laser beams scanned by the Galvano mirror 21a are dispersed in the predetermined directions by the diffraction grating 100 and, thereafter, are incident on the pupil 24 of the user via the second relay optical system 22. Accordingly, the user can recognize an image formed of the laser beams which are scanned two-dimensionally and are projected on a retina of the user in this manner. That is, in this retinal scanning display 1, an image is projected on a retina of at least one of user's eyes by scanning and radiating light modulated in response to an image signal relating to an image thus displaying the image. Although the Galvano mirror 19a in the horizontal scanning system 19 and the Galvano mirror 21a in the vertical scanning system 21 have been explained using the same term "Galvano mirror", it is needless to say that, provided that a reflection surface can be oscillated (rotated) for scanning light, the mirror may be driven by a driving method of any type such as piezoelectric driving, electromagnetic driving, electrostatic driving or the like.

Here, the diffraction grating 100 is explained hereinafter in conjunction with FIG. 2 to FIG. 6.

Figure 2:
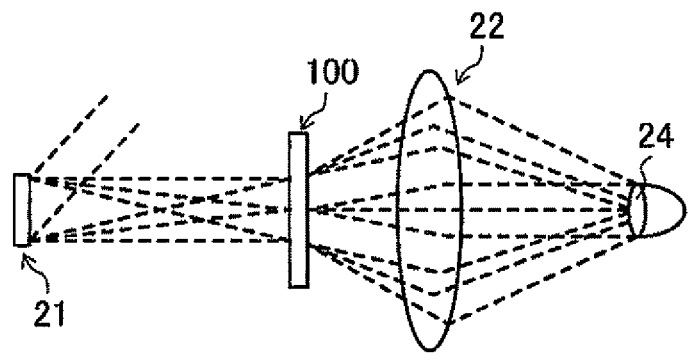
FIG. 2 is an explanatory view showing the constitution of the retinal scanning display according to the embodiment.

The diffraction grating 100 has the optical dispersion function which disperses light from the light source. As shown in FIG. 2, the diffraction grating 100 is arranged on an intermediate image plane which is arranged between the vertical scanning system 21 and the second relay optical system 22 and on which the optical fluxes scanned by the vertical scanning system 21 are converged. In other words, the diffraction grating 100 is arranged on the intermediate image plane which is arranged on an optical path of light from the light source between the scanning part including the vertical scanning system 21 and the pupil 24 of the user and on which an intermediate image formed of light from the light source is focused. Accordingly, the diffraction grating 100 can prevent the degradation of the image attributed to the dispersion of light from the light source.

In this embodiment, the diffraction grating 100 is arranged on the intermediate image plane on which the intermediate image formed of light from the light source is focused. However, even when the position of the diffraction grating 100 does not completely agree with the position of the intermediate image plane, that is, even when the diffraction grating 100 is arranged at an offset position in the vicinity of the intermediate image plane which is slightly displaced from the intermediate image plane, a user cannot visually recognize the degradation of an image which occurs due to the displacement. Even when the user can visually recognize the degradation of an image, the degradation of the image is within an allowable range such that the degradation does not bother the user. Accordingly, the diffraction grating 100 may be arranged at such an offset position. Further, the diffraction grating 100 may be arranged on an intermediate image plane which is formed at a position different from the position where the above-mentioned intermediate image plane is formed. For example, by designing the optical system such that an intermediate image plane is formed on a stage in front of the first relay optical system 20 and by arranging the diffraction grating 100 on the intermediate image plane, the diffraction grating 100 can also acquire desired advantageous effects. Also in this case, by arranging the diffraction grating 100 at an offset position in the vicinity of the intermediate image plane which is slightly displaced from the intermediate image plane, the diffraction grating 100 can acquire the above-mentioned predetermined advantageous effects.

Figure 3:
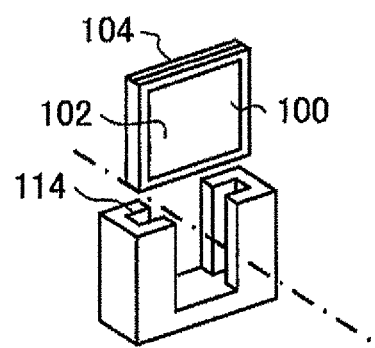
FIG. 3 is an explanatory view showing a diffraction grating of the retinal scanning display according to the embodiment.

As shown in FIG. 3, the diffraction grating 100 is constituted of a diffraction grating body 102 and a frame body 104. Further, for fixing the diffraction grating 100 on the optical axis, a receiving member 114 which receives the diffraction grating 100 is provided.

Figure 4A:
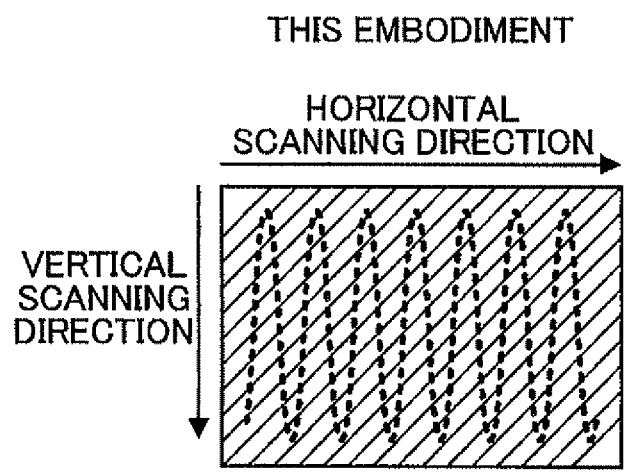
FIG. 4A is an explanatory view showing a diffraction grating of the retinal scanning display according to the embodiment.

Further, in this embodiment, as shown in FIG. 4A, the diffraction grating 100 has a rectangular shape. Further, in the diffraction grating 100, a diffraction direction is set to approximately 45 degrees with respect to a side of the rectangular shape. When the diffraction grating 100 is fixed to the above-mentioned receiving member 114, one side of the rectangular shape extends in the horizontal scanning direction of light and another side of the rectangular shape extends in the vertical scanning direction of light. Accordingly, the diffraction grating 100 diffracts light in a predetermined diffraction direction. To be more specific, the diffraction grating 100 is arranged such that a projection of a diffraction direction on the diffraction element with respect to both the horizontal scanning direction (scanning direction in the first scanning part) and the vertical scanning direction (scanning direction in the second scanning part) becomes approximately 45 degrees.

Figure 4B:
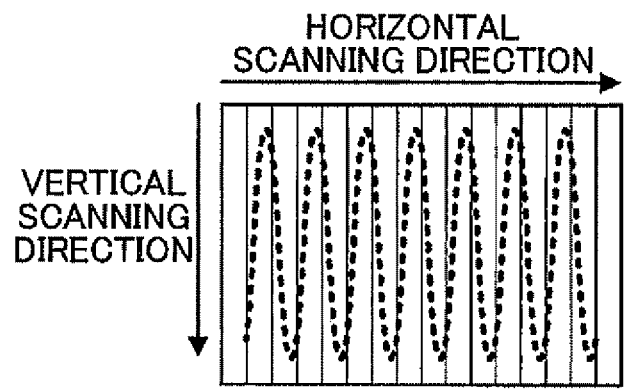
FIG. 4B is an explanatory view showing a diffraction grating of a conventional retinal scanning display.

On the other hand, conventionally, as shown in FIG. 4B, in the diffraction grating 100, the diffraction direction is set approximately horizontal with respect to one side of a rectangular shape. Further, when the diffraction grating 100 is fixed to the above-mentioned receiving member 114, one side of the rectangular shape extends in the horizontal scanning direction and another side of the rectangular shape extends in the vertical scanning direction. Accordingly, the diffraction grating 100 is arranged at an angle where the diffraction direction becomes substantially horizontal with respect to the horizontal scanning direction (scanning direction in the first scanning part) or becomes substantially horizontal with respect to the vertical scanning direction (scanning direction in the second scanning part).

Figure 5:
FIG. 5 is an explanatory view showing the diffraction grating of the retinal scanning display according to the embodiment.

As shown in FIG. 5, stripe-shaped concaves and convexes are formed on the diffraction grating 100 at a predetermined pitch. When the light is incident on the diffraction grating 100 along the concaves and convexes, there may be a case where intensity of the incident light is lowered so that a periodic line-shaped pattern (so-called "beat") is generated.

Figure 6A:
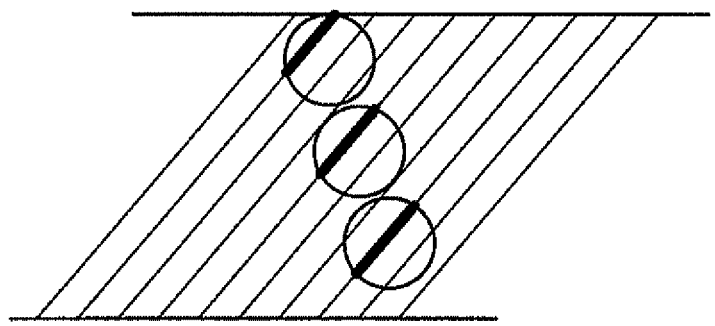
FIG. 6A is an explanatory view showing the diffraction grating of the retinal scanning display according to the embodiment.
Figure 6B:
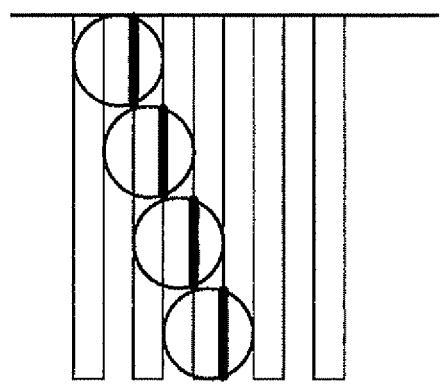
FIG. 6B is an explanatory view showing a diffraction grating of a conventional retinal scanning display.

Accordingly, conventionally, as shown in FIG. 6B, either one of the scanning in the vertical scanning direction and the scanning in the horizontal direction is performed along the concaves and convexes. In this case, portions where the intensity of light is lowered are arranged close to each other thus giving rise to a possibility that one oblique line pattern is visually recognized in an image.

Accordingly, in this embodiment, as shown in FIG. 6A, an angle made by the respective scanning directions and the stripes becomes approximately 45 degrees so that the number of portions where the intensity of incident light is lowered becomes small and at the same time, the pitch between the portions where the intensity of incident light is lowered is increased compared to the related art whereby the line-shaped pattern is hardly visually recognized. Further, the portions where the intensity of incident light is lowered are not arranged in line so that the intensity is averaged thus preventing the periodic occurrence of a line-shaped pattern.

In this manner, the diffraction direction in the diffraction element and the scanning direction of light in the scanning part intersect with each other at approximately 45 degrees so that it is possible to prevent the periodic occurrence of a line-shaped pattern without taking the relationship between the pitch of light in the diffraction direction and the pitch of light in the scanning direction into consideration. Further, even when the light is scanned in the two-dimensional directions, the diffraction direction intersects with both two scanning directions at approximately 45 degrees so that it is possible to prevent the periodic occurrence of a line-shaped pattern without taking the relationship between the pitch of light in the diffraction direction and the pitch of light in the scanning direction into consideration. Further, the diffracting element has a rectangular shape and the diffraction direction is at an approximately 45 degrees with respect to sides of the rectangular shape whereby the arrangement position of the diffraction element can be easily decided.

In this embodiment, the diffraction grating 100 is arranged such that the light is diffracted at approximately 45 degrees with respect to the respective scanning directions. However, the present invention is not limited to such arrangement of the diffraction grating 100. For example, even when the diffraction grating 100 is arranged such that the light is diffracted at an angle of approximately 30 to 60 degrees with respect to the respective scanning directions, the equal advantageous effects of the present invention can be acquired to some extent so that the periodic occurrence of a line-shaped pattern can be prevented.

Figure 7:
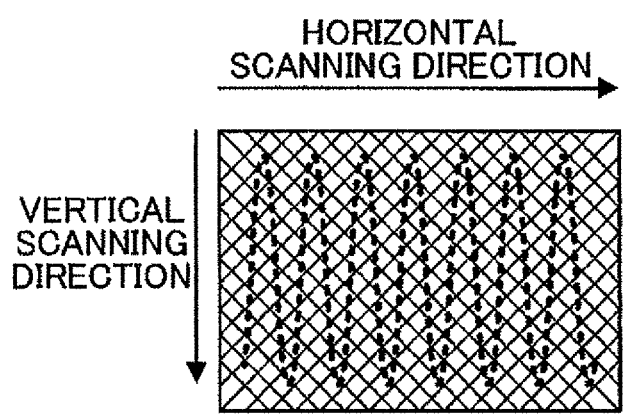
FIG. 7 is an explanatory view showing the diffraction grating of the retinal scanning display according to the embodiment.

Further, in this embodiment, the diffraction grating 100 is arranged such that the light is diffracted at approximately 45 degrees with respect to the horizontal scanning direction and the vertical scanning direction respectively. However, the present invention is not limited to such arrangement of the diffraction grating 100. For example, as shown in FIG. 7, a diffraction grating which can diffract the light at approximately 45 degrees with respect to both the horizontal scanning line and the vertical scanning line and two light diffraction directions intersect with each other. In this case, the diffraction grating may be constituted of two diffraction elements whose diffraction directions intersect with each other, and may be constituted of a two-dimensional diffraction element in which the diffraction directions intersect with each other. Due to such a constitution, without taking the relationship between the pitch of light in the diffraction direction and the pitch of light in the scanning direction into consideration, it is possible to set the plurality of diffraction directions thus preventing the periodic occurrence of a line-shaped pattern.

Figure 8:
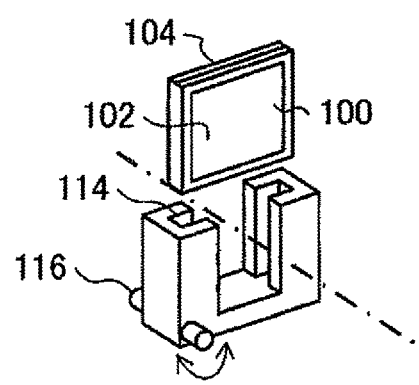
FIG. 8 is an explanatory view showing the diffraction grating of the retinal scanning display according to the embodiment.

Further, although the diffraction grating 100 is completely fixed in this embodiment, the present invention is not limited to such a constitution and the diffraction grating 100 may be rotated about the optical path direction. For example, as shown in FIG. 8, a rotary shaft 116 is formed on a receiving member 114. The rotary shaft 116 is rotatably mounted on a wall surface toward the optical path direction. Accordingly, the receiving member 114 is rotatable about the rotary shaft 116 which is used as the center of rotation. A lock member (not shown in the drawing) which fixes the receiving member 114 is also provided. These receiving members 114 and the rotary shaft 116 constitute a rotary mechanism which is rotatable about the optical path direction and the diffraction element 100 may be rotated by the rotary mechanism. Due to such a constitution, to prevent the periodic occurrence of a line-shaped pattern, an angle of the diffraction element can be finely adjusted by rotating the diffraction element.

Although some embodiments of the present invention have been explained in detail based on drawings heretofore, the embodiments are provided only as examples and the present invention can be carried out by those who are skilled in the art in other modes with various modification and improvements including the mode described in the Disclosure of the Invention.

What is claimed is:

1. A retinal scanning display comprising:
a light source part which is configured to radiate a light modulated in response to an image signal relating to an image;
a scanning part which is configured to display the image by scanning the light radiated from the light source part in a predetermined scanning direction; and
a diffraction element which is arranged on an optical path of the light radiated from the light source part and is configured to diffract the light radiated from the light source part in a predetermined diffraction direction, where
the diffraction element is arranged such that the light is diffracted at approximately 45 degrees with respect to the scanning direction; and
the diffraction element has a stripe shape at a predetermined pitch, and an angle made between the scanning direction and stripes is set to approximately 45 degrees;
wherein the scanning part is constituted of a first scanning part which scans the light radiated from the light source part in a first scanning direction and a second scanning part which scans the light radiated from the light source part in a second scanning direction which is substantially orthogonal to the first scanning direction, and
the diffraction element is arranged such that the light is diffracted at approximately 45 degrees with respect to both the first scanning direction and the second scanning direction.

2. The retinal scanning display according to claim 1, wherein the diffraction element includes a rotary mechanism which rotates the diffraction element about a direction of the optical path.

3. The retinal scanning display according to claim 1, wherein the diffraction element has a rectangular shape, and the diffraction direction of the light is set to an approximately 45 degrees with respect to a side of the rectangular shape.

4. The retinal scanning display according to claim 1, wherein the diffraction element is constituted of two diffraction elements whose diffraction directions of the light are set orthogonal to each other.

5. The retinal scanning display according to claim 1, wherein the diffraction element is constituted of a two-dimensional diffraction element whose diffraction directions of the light are set orthogonal to each other.

* * * * *